US012716428B2

(12) United States Patent
Janjic et al.

(10) Patent No.: US 12,716,428 B2
(45) Date of Patent: Aug. 25, 2026

(54) NOISE-OPTIMIZED CENTRIFUGAL PUMP

(71) Applicant: KSB SE & Co. KGaA, Frankenthal (DE)

(72) Inventors: Boris Janjic, Frankenthal (DE); Axel Schunk, Frankenthal (DE); Stefan Laue, Frankenthal (DE); Jochen Schaab, Frankenthal (DE)

(73) Assignee: KSB SE & Co. KGaA, Frankenthal (DE)

( * ) Notice: Subject to any disclaimer, the term of this patent is extended or adjusted under 35 U.S.C. 154(b) by 62 days.

(21) Appl. No.: 18/578,788

(22) PCT Filed: Jul. 13, 2022

(86) PCT No.: PCT/EP2022/069590
§ 371 (c)(1),
(2) Date: Jan. 12, 2024

(87) PCT Pub. No.: WO2023/285524
PCT Pub. Date: Jan. 19, 2023

(65) Prior Publication Data
US 2024/0309887 A1 Sep. 19, 2024

(30) Foreign Application Priority Data
Jul. 15, 2021 (DE) ..................... 10 2021 118 378.2

(51) Int. Cl.
*F04D 29/58* (2006.01)
*F04D 1/00* (2006.01)
(Continued)

(52) U.S. Cl.
CPC ........... *F04D 29/5813* (2013.01); *F04D 1/00* (2013.01); *F04D 13/0686* (2013.01); *H02K 5/18* (2013.01); *H02K 9/06* (2013.01)

(58) Field of Classification Search
CPC .... F04D 29/5813; F04D 1/00; F04D 13/0686; H02K 5/18; H02K 9/06
See application file for complete search history.

(56) References Cited

U.S. PATENT DOCUMENTS 4,963,778 A 10/1990 Jensen et al.
5,763,969 A * 6/1998 Metheny ................ H02K 11/33 310/58

(Continued)

FOREIGN PATENT DOCUMENTS

CN 105490462 A 4/2016
CN 105545721 A 5/2016

(Continued)

OTHER PUBLICATIONS

International Search Report (PCT/ISA/210) issued in PCT Application No. PCT/EP2022/069590 dated Oct. 20, 2022 with English translation (5 pages).

(Continued)

*Primary Examiner* — Andrew J Marien
(74) *Attorney, Agent, or Firm* — Crowell & Moring LLP

(57) ABSTRACT

A centrifugal pump includes an electric motor. The electric motor has a motor casing and a base body. The electric motor comprises motor electronics which are carried by an arrangement for heat dissipation. The arrangement for heat dissipation has a contour, which corresponds to a contour of the motor casing, configured to at least partially directly contact of the two contours.

20 Claims, 5 Drawing Sheets

(51) Int. Cl.
*F04D 13/06* (2006.01)
*H02K 5/18* (2006.01)
*H02K 9/06* (2006.01)

(56) References Cited

U.S. PATENT DOCUMENTS

| | | | | |
|---|---|---|---|---|
| 7,923,875 | B2 | 4/2011 | Henry et al. | |
| 7,977,832 | B2 * | 7/2011 | Vadillo | H02K 11/33 310/58 |
| 10,439,475 | B2 * | 10/2019 | Madsen Obel | H02K 5/18 |
| 2009/0267432 | A1 | 10/2009 | Henry et al. | |
| 2011/0026227 | A1 | 2/2011 | Monster et al. | |
| 2015/0001973 | A1 * | 1/2015 | Mikkelsen | F04D 29/5806 310/64 |
| 2021/0006190 | A1 * | 1/2021 | Largent | H02K 5/15 |
| 2022/0213899 | A1 * | 7/2022 | Sato | F04D 29/104 |

FOREIGN PATENT DOCUMENTS

| | | | |
|---|---|---|---|
| DE | 103 39 585 | A1 | 3/2005 |
| DE | 10 2005 032 968 | A1 | 2/2007 |
| DE | 10 2008 051 650 | A1 | 4/2010 |
| EP | 0 456 169 | B1 | 3/1995 |
| EP | 1 104 079 | B1 | 2/2005 |
| EP | 2 110 929 | B1 | 8/2018 |

OTHER PUBLICATIONS

German-language Written Opinion (PCT/ISA/237) issued in PCT Application No. PCT/EP2022/069590 dated Oct. 20, 2022 with English translation (9 pages).

German Search Report issued in German Application No. 10 2021 118 378.2 dated Jul. 13, 2022 with partial English translation (12 pages).

* cited by examiner 1
28
29
3
19
30
4
26
20
5
25
27
21
24
23
22
2

18
20
33
26
5
3
1

11
12
16
13
14
17
9
20
6
8
10
3
7
12
5
1

36
35
34
38
32
37
31

NOISE-OPTIMIZED CENTRIFUGAL PUMP

CROSS REFERENCE TO RELATED APPLICATION

This application claims priority under 35 U.S.C. § 119 from German Patent Application No. 102021118378.2, filed Jul. 15, 2021, the entire disclosure of which is herein expressly incorporated by reference.

BACKGROUND

The disclosure relates to a centrifugal pump having an electric motor which has a motor casing and a base body, wherein the electric motor comprises motor electronics which are carried by an arrangement for heat dissipation.

Such electric motors are generally known and are mainly mass-produced. An electric motor consists of a rotor, which is connected in a rotationally fixed manner to the motor shaft, a stator having a wound stator pack, a stator housing having cooling fins on the outside, bearing plates on both sides, said bearing plates having roller or slide bearings, and a fan wheel which is connected in a rotationally fixed manner to the shaft at the shaft end opposite the drive side and is surrounded by a fan cowl which is fixedly connected to the stator housing.

There is frequently arranged on the stator housing a box, the so-called electronics housing, in which the components of the motor electronics are installed. The motor electronics generally comprise a frequency converter and a power control and/or speed controller. Such electronics housings are often arranged on a base, so that the waste heat of the electric motor does not affect the electric motor and the cooling air stream generated by the motor fan can also be used for cooling the motor electronics.

For this purpose, the fan cowl on the one hand directs the cooling air exiting radially from the fan wheel in the axial direction to the cooling fins of the stator housing and on the other hand prevents the ingress of foreign bodies by means of a grille arranged on the inflow side of the fan wheel.

U.S. Pat. No. 4,963,778 describes an electric motor having a static frequency converter which is arranged spaced apart from the electric motor by a free space. The rotation of a fan generates an air stream which cools the electric motor and the frequency converter. Cooling is improved with the aid of a ventilation housing.

DE 103 39 585 A1 describes an axially generated cooling air stream for an electric motor having a frequency converter, said cooling air stream being deflected by means of air-directing elements for cooling a radially constructed terminal box. The air-directing elements can be variably arranged in order to achieve the aim of sufficient cooling.

DE 10 2008 051 650 A1 discloses an disclosure with joint cooling of the motor and of the motor electronics, in which the air stream is drawn by suction through the intake grille of the electronics cooling before the fan wheel drives the air stream for cooling the motor and the switch box.

By spacing apart the terminal box on a base, it is difficult to achieve a compact and space-saving arrangement of the motor electronics on the electric motor. The fan for cooling the motor and the electronics must in most cases generate considerable air movements, which cause significant noise.

EP 2 110 929 B1 describes a frequency converter which is mounted peripherally on an electric motor. For heat dissipation, cooling fins are connected to the heat-generating components obliquely and additionally transversely to the longitudinal fins. The frequency converter is spaced apart from the electric motor by way of a connection frame. It is a disadvantage that the cooling fins are closed on one side, so that the cooling air stream can be formed to only a reduced extent and at the same time cannot be developed with low noise.

SUMMARY

One object of the disclosure is to configure a centrifugal pump having an electric motor as compactly as possible and at the same time provide sufficient cooling power for the electric motor and the motor electronics thereof. It is to be possible to operate the electric motor and the cooling arrangement thereof with as little noise as possible. The replacement of spare parts is to be facilitated by the construction of the electric motor with its motor electronics. It is to be possible to produce the device simply and inexpensively.

This and other objects are achieved according to the disclosure by a centrifugal pump having an electric motor. Preferred variants will be found in the description and the drawings.

According to the disclosure, the arrangement for heat dissipation has a contour which corresponds to a contour of the motor casing. The two parts of a fully integrated centrifugal pump arrangement thus fit together perfectly and form a compact and space-optimized unit, entirely without large superstructures and spacings. At the same time, the configurations of the contours permit optimal heat dissipation and efficient, noise-reduced cooling of the fully integrated centrifugal pump arrangement.

The contour in most cases describes an outline or a silhouette of an object. To an observer, it can represent a curve which delimits the object from its surroundings. The outline of an object depends on the shape of the object and sketches a line by which something is limited.

Within the meaning of the disclosure, the contour of the arrangement for heat dissipation and also the contour of the motor casing can be in the form of a continuous, closed body. In addition, the contours can also be formed by elements which form the shape of the contours partially and also in an open manner and which can have interruptions or omissions. In an advantageous variant of the disclosure, the contour of the arrangement for heat dissipation is not formed without interruption by the surface-area-increasing elements, and the contour of the motor casing is formed by the uninterrupted, cylindrical motor casing itself.

The term corresponding refers to matching or conformity. Within the meaning of the disclosure, the fit of the contours of the arrangement for heat dissipation and of the motor casing is matching. The contours correspond to one another in the way that the components are positioned on one another seamlessly in order to form a compact and integrated overall form.

According to the disclosure, the arrangement for heat dissipation has surface-area-increasing elements with which it is formed in one piece. In a preferred variant of the disclosure, it is an aluminum casting consisting of a base body, which carries the motor electronics, with integrally molded cooling fins. The cooling fins are plate-shaped, in order to increase the surface area for heat dissipation. The material aluminum is particularly advantageously suitable for rapidly conducting the waste heat generated by the motor and the motor electronics into the cooling fins, where a noise-reduced cooling air stream absorbs the waste heat and dissipates it away from the fully integrated centrifugal pump arrangement.

Ideally, the base body of the arrangement for heat dissipation is configured in a shape that corresponds to the shape of the motor casing. The base body has a raised seat in the middle and two outer installation surfaces with depressions. Advantageously, the shape of the base body also permits a compact configuration of the fully integrated centrifugal pump arrangement.

In a particularly advantageous variant of the disclosure, the motor casing is cylindrical. This corresponds to the optimal use of installation space for an electric motor and is thus the basis for the compact, space-optimized configuration of the fully integrated centrifugal pump arrangement.

According to the disclosure, the motor casing can have heat-dissipating elements which are arranged in the form of cooling fins perpendicularly and/or horizontally on the motor casing. For an optimal fit for the arrangement for heat dissipation, an upper segment of the motor casing is free of cooling fins.

The compact configuration of the electric motor with the mounted motor electronics is achieved by the arcuate or curved contour of the arrangement for heat dissipation. The arcuate or curved contour advantageously corresponds to the cylindrical shape of the motor casing.

Ideally, the arrangement for heat dissipation forms cooling channels with the integrally molded cooling fins and the cylindrical casing of the electric motor. For this purpose, the contact surfaces of the cooling fins with the motor casing correspond to the contour of the motor casing, so that they have the curvature of the motor casing. As a result of the correspondingly configured contours, trapezoidal cross sections of the cooling channels are obtained.

In a particularly advantageous variant of the disclosure, the outer plate-like cooling fins of the arrangement for heat dissipation form with those of the motor casing in each case an outer cooling channel, which additionally improves the heat-dissipating capacity of the electric motor and of the motor electronics. These two additional cooling channels contribute toward the compact configuration of the centrifugal pump arrangement with, at the same time, excellent cooling efficiency.

According to the disclosure, the arrangement for heat dissipation has at least one cutout for centering on a positioning element of the motor casing, in particular on a cooling fin of the motor casing. This cutout advantageously corresponds to the positioning element and thus has an accurate fit. In addition, in a variant of the disclosure, three cutouts are provided on different cooling fins of the arrangement for heat dissipation, said cutouts fitting accurately on three positioning elements which are arranged on different cooling fins of the motor casing. Direct and rapid centering of the arrangement for heat dissipation on the motor casing is thus achieved in a particularly advantageous manner.

According to the disclosure, in each case two cutouts for centering are arranged on the outer cooling fins, which are in the form of struts, of the arrangement for heat dissipation, so that the two outer cooling fins are in direct contact with the motor casing. In an extremely advantageous variant of the disclosure, all the cooling fins of the arrangement for heat dissipation, as a result of the particular configuration of the contour, are in direct contact with the motor casing, so that the heat-dissipating capacity is particularly ideal.

Ideally, unlike in the prior art, neither components nor frames for spacing are arranged between the arrangement for heat dissipation and the motor casing. In this disclosure, the arrangement for heat dissipation and the motor casing are for the first time of an extremely compact and space-optimized form. The powerful and low-noise cooling effectively prevents the electrical and electronic components from being impaired by excessive heat and makes the compact design possible.

For connecting the motor electronics to the stator winding of the electric motor, the arrangement for heat dissipation has at least one guide channel for connection elements, in particular for suitable cables. There is advantageously formed on the motor casing a duct for interlocking connection to the guide channel of the arrangement for heat dissipation for the passage of the connection elements. This well-thought-out cable guide is an element for achieving the compact configuration of the centrifugal pump arrangement. At the same time, the fitting of the guide channel to the duct can likewise serve for centering the arrangement for heat dissipation on the motor casing.

The term fully integrated centrifugal pump arrangement describes the fundamental idea of constructing a centrifugal pump integrally with an electric motor, including the motor electronics mounted thereon, which is connected by way of a lantern, in order to achieve a particularly compact and space-saving arrangement. The simultaneous and integral construction results in an ideal fit of all parts of the arrangement, which likewise provides a considerable cooling capacity, without spacing the motor electronics apart from the electric motor, and reduces the noise emission of the arrangement. The fully integrated approach further takes into consideration an extremely short lantern for connecting the electric motor to the centrifugal pump. The thermal impairment of the electric motor by the centrifugal pump is taken into consideration on the one hand by means of integrated heat conduction barriers within the lantern and on the other hand by a structural continuation of the cooling air stream downstream of the arrangement for heat dissipation beyond the lantern.

The fully integrated centrifugal pump arrangement, which can also be referred to as an integral pump, has a continuous shaft, a lantern integrated in the motor, motor electronics integrated in the motor, and in particular a unidirectional noise-optimized fan wheel. In particular the fan cowl is designed for optimal inflow to the motor and to the arrangement for heat dissipation and thereby achieves a low noise level.

Within the lantern, which connects the pump casing directly to the electric motor, there is arranged at least one heat conduction barrier. Such a heat conduction barrier is particularly advantageous for thermally decoupling a pump casing, through which a hot fluid flows, from the driving electric motor. This protects in particular the motor and also the parts installed therein, and achieves operation of the pump in the desired operating range.

Preferably, such a heat conduction barrier is designed as a material cutout. The space of a material cutout is generally occupied by air, which is known to be a particularly good insulator and thus constitutes a barrier to heat conduction.

For this purpose, the lantern is preferably cylindrical and/or trumpet-shaped. This spatial configuration is particularly advantageous for achieving additional cooling of the lantern by the cooling air stream, which is generated by the fan wheel.

Ideally, surface-area-increasing elements for heat dissipation can likewise be arranged on the lantern. The surface-area-increasing elements are preferably in the form of cooling fins, in order to optimize the heat dissipation of the lantern. The cooling fins are plate-shaped and/or trapezoidal and/or triangular and/or arcuate and/or annular. Owing to the optimized heat dissipation of the lantern, the pump casing, which can have high temperatures owing to the passage of hot fluids, and the motor casing are virtually thermally decoupled.

The optimization of the heat dissipation of the lantern is achieved by the advantageous construction of the lantern. The fan of the electric motor generates a cooling air stream, which cools the cooling fins of the motor casing and the arrangement for heat dissipation of the motor electronics and then flows over the lantern. The lantern is constructed such that the inside diameter remains constant over the length of the base body of the lantern and the outside diameter increases. In this particularly advantageous manner, the cooling air stream flows over the cooling fins of the lantern and efficiently dissipates the heat. At the same time, the construction of the lantern directs the cooling air stream over the pump casing, so that the inflow to the pump casing represents a reduced flow resistance.

A further aspect of the fully integrated centrifugal pump arrangement is the configuration of the fan cowl. Ideally, blade-like guide elements are arranged in the fan cowl. These guide elements have a radial inlet edge and an axial outlet edge. They are arranged stationarily in the cowl of the fan. Their function is, with minimal losses, to divert the swirl flow leaving the fan wheel into a flow that is as free of swirl as possible for cooling the electric motor and the motor electronics. Advantageously, cooling is thus very effective even at a low speed of the electric motor, because the air flow takes place directed to the location of the heat dissipation, in particular the cooling channels. The blade-like cooling elements are designed in a comparable manner to the guide vanes of guide wheels, which are predominantly arranged in multi-stage pumps downstream of the centrifugal impellers. They surround the fan wheel in a radial space around the fan wheel.

A directed cooling air flow is very important for efficient cooling with full cooling capacity. Ideally, the fan cowl forms an annular channel between the wall inner surface of the cylindrical part of the fan cowl and a wall outer surface of the motor casing. Firstly, the cooling air flow drawn in and generated by the fan wheel is deflected from a radial direction into an axial direction by the guide elements of the fan cowl and also by the shape of the cowl itself. Owing to the shaping of the blade-like guide elements, deflection takes place without turbulence, flow separation and without disadvantageous sound emission.

Ideally, the fan wheel has blades which are curved backward in the rotational direction. The rear shroud of the fan wheel has a hub projection formed on the suction side of the cooling air flow, on which the blades engage offset from the center. The blades project from the rear shroud in the suction-side direction and preferably have a profile which is curved contrary to the rotational direction.

The flow-optimized generation of the cooling air stream with the fan wheel is achieved in particular by the blade arrangement. The blades of the fan wheel are curved radially contrary to the rotational direction. They are preferably seated on a trumpet shape outside the mid-point and thus with an arrangement on the rear shroud that is offset from the center.

A centrifugal pump arrangement which combines all the features of this integration of all the required individual parts in this advantageous manner has not been known hitherto.

Further features and advantages of the disclosure will become apparent from the description of exemplary embodiments with reference to the drawings and from the drawings themselves, in which:

DETAILED DESCRIPTION

Figure 1:
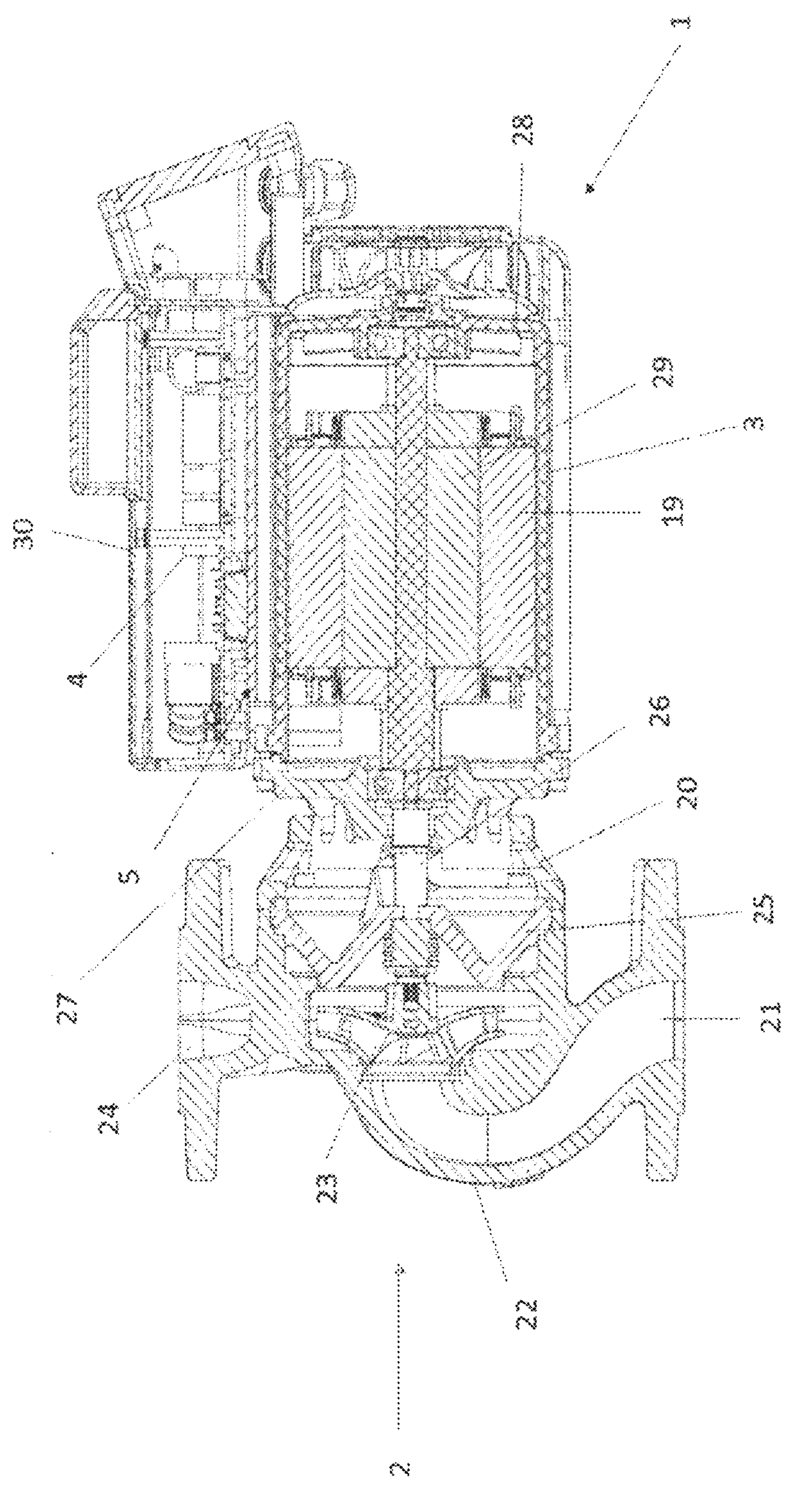
FIG. 1 shows a section through an electric motor with a centrifugal pump connected by way of an integrated lantern.

FIG. 1 shows a section through an electric motor 1 with a centrifugal pump 2 connected by way of an integrated lantern 20. The fluid enters the pump casing 22 of the centrifugal pump 2 through a suction port 21. The impeller 23 is arranged inside the pump casing 22. The impeller 23 transmits kinetic energy to the fluid, which leaves the centrifugal pump 2 by way of the pressure side connection 24. The space filled with fluid and the impeller 23 is delimited by a pump casing 22 and a casing cover 25. The impeller 23 is connected in a rotationally fixed manner to a continuous shaft 26, which is driven by the electric motor 1.

The continuous shaft 26 is supported and rotatably mounted by the integrated roller bearing by a bearing plate 27 on the pump side and by a bearing plate 28 on the motor side. The continuous shaft 26 has a rotor 29. The circumferential magnetic field of the stator winding 19 drives the rotor 29 in accordance with the electromotive principle.

The base body 7 of the arrangement for heat dissipation 5 is seated on the motor casing 3 and carries the motor electronics 4. The electronics housing cover 30 closes off the motor electronics 4, which in this variant of the disclosure consist of a frequency converter, a power control and/or speed controller. FIG. 1 shows a fully integrated centrifugal pump arrangement, which is of extremely compact and space-optimized construction. The integration of the entirety of the arrangement for heat dissipation 5, the lantern 20 and the motor electronics 4 results in a space-saving arrangement, which at the same time has very powerful and noise-reduced cooling.

Figure 2:
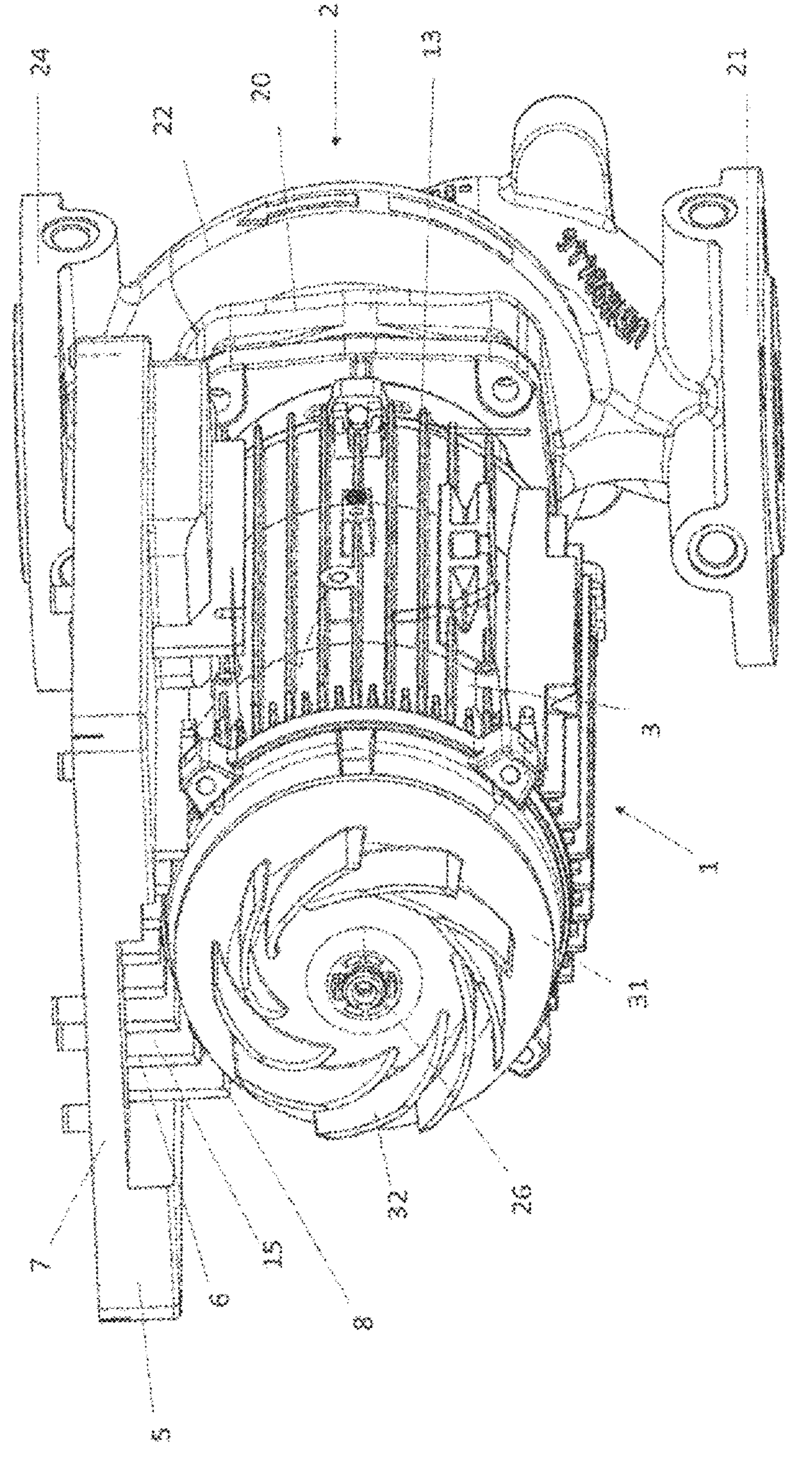
FIG. 2 is a perspective view of the integral pump with the electric motor and the fan wheel.

FIG. 2 is a perspective view of the centrifugal pump 2 with the electric motor 1 and the fan wheel 31. In this perspective view, the centrifugal pump 2 is partly concealed by the electric motor 1, wherein the suction port 21 is visible therebeneath, the pressure side connection 24 is visible thereabove, and the pump casing 22 is visible at the side. The motor casing 3 of the electric motor 1 has heat-dissipating elements 13, some of which are arranged perpendicularly and some of which are arranged horizontally on the motor casing 3. The arrangement for heat dissipation 5, which is formed of a base body 7 with integrally molded surface-area-increasing elements 6, is seated on the motor casing 3. In this exemplary embodiment, the surface-area-increasing elements 6 and the heat-dissipating elements 13 are in the form of plate-shaped cooling fins. The mounted arrangement for heat dissipation 5 with the plate-shaped cooling fins forms with the motor casing 3 cooling channels 15 which have a trapezoidal cross section. The contact surfaces 8 of the cooling fins correspond to the curvature of the motor casing 3, so that the arrangement for heat dissipation 5 sits in a compact and gap-free manner on the motor casing 3.

On the side of the electric motor 1 remote from the pump, the fan wheel 31 is arranged on the continuous shaft 26. The fan wheel 31 has blades 32 which are curved backward in the rotational direction and which generate a particularly powerful and at the same time low-noise cooling air stream.

Figure 3:
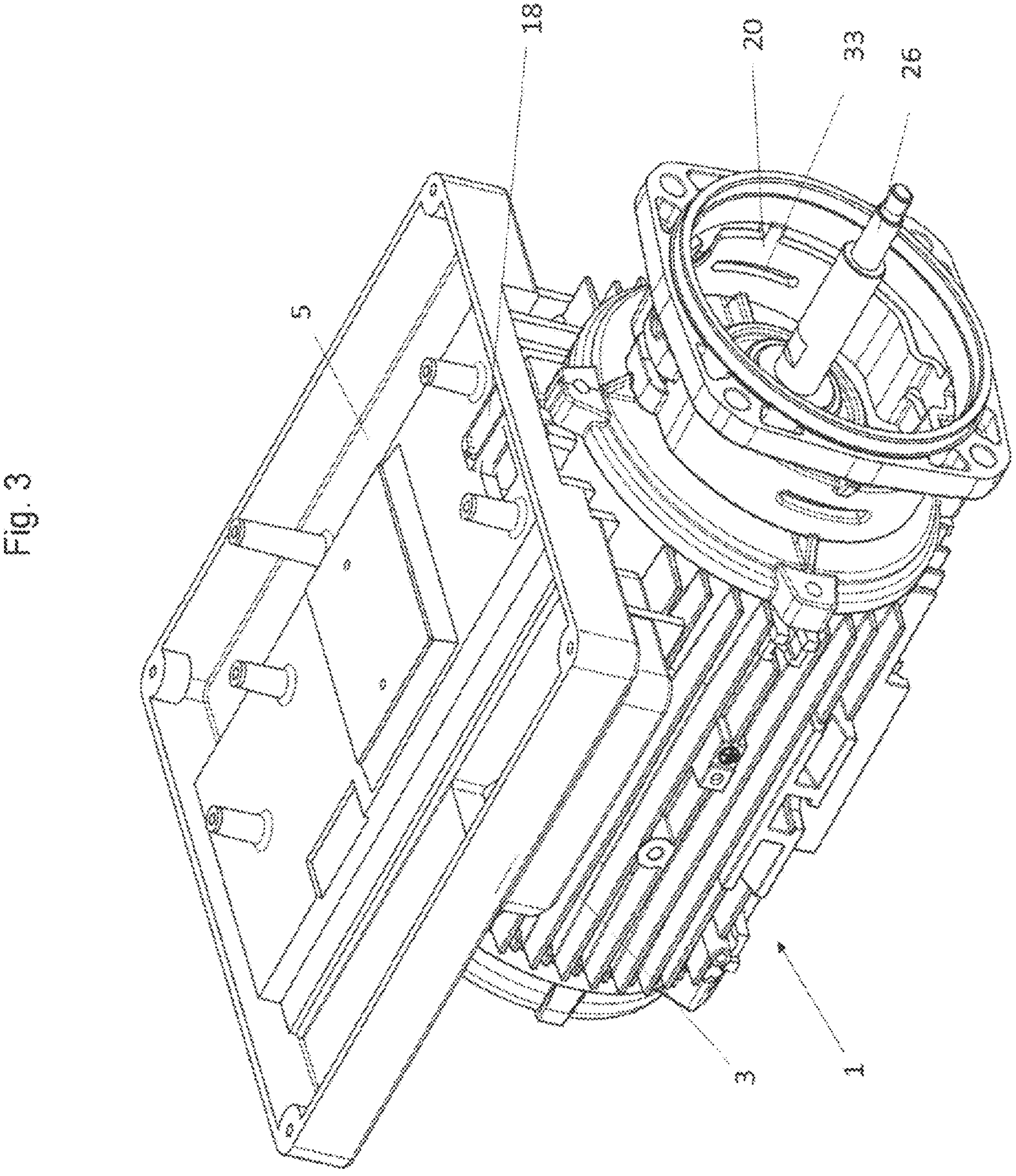
FIG. 3 is a perspective view of the arrangement for heat dissipation on the electric motor.

FIG. 3 is a perspective view of the arrangement for heat dissipation 5, which is arranged on the motor casing 3 of the electric motor 1. The arrangement for heat dissipation 5 has a guide channel 18 for the passage of connection elements in the form of communication lines or cables. The motor casing 3 merges seamlessly into the lantern 20, which surrounds the continuous shaft 26. In this exemplary embodiment, the lantern 20 has multiple heat conduction barriers 33, which are in the form of material cutouts. The lantern 20 thermally decouples the centrifugal pump 2 (not shown) from the electric motor 1.

Figure 4:
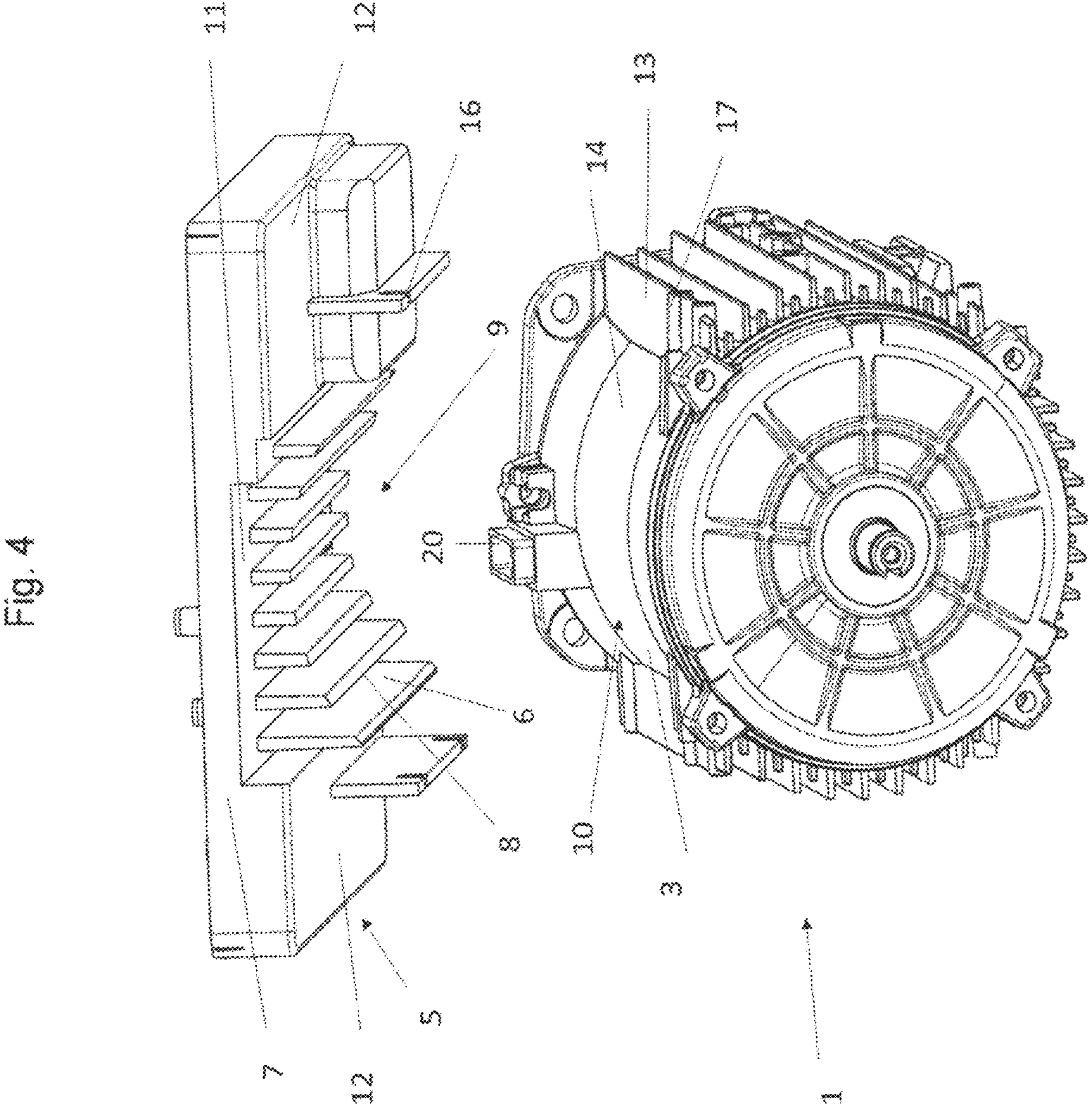
FIG. 4 is an exploded view of the arrangement for heat dissipation and of the electric motor.

FIG. 4 is an exploded view of the arrangement for heat dissipation 5 and the electric motor 1. The motor casing 3 of the electric motor 1 has a contour 10 which is given by the cylindrical form of the motor casing 3 shown in this exemplary embodiment. On the motor casing 3 there are arranged heat-dissipating elements 13 in the form of plate-like cooling fins, some of which are oriented vertically and some horizontally. For correspondingly receiving the arrangement for heat dissipation 5, the upper segment 14 of the motor casing 3 is configured without heat-dissipating elements 13 arranged thereon. For the passage of connection elements between the motor electronics 4 and the stator winding 19, the motor casing 3 has a duct 20 for interlocking connection to the guide channel 18.

The arrangement for heat dissipation 5 has a base body 7, which comprises a raised seat 11 in the middle and two lower-lying installation surfaces 12 on the outside. Surface-area-increasing elements 6 in the form of plate-like cooling fins are molded in one piece on the underside of the base body 7. The contour 9 of the arrangement for heat dissipation 5 corresponds to the contour 10 by the curvature of the contact surfaces 8 of the cooling fins. The arrangement for heat dissipation 5 can thus be attached in a compact manner to the motor casing 3, so that a space-optimized centrifugal pump arrangement can be produced. For centering the arrangement for heat dissipation 5 on the motor casing 3, the surface-area-increasing elements 6 have at least one cutout 16, said cutouts corresponding to the positioning elements 17. For this purpose, the heat-dissipating elements 13 of the motor casing 3 have the same number of positioning elements 17 as there are cutouts 16 in the surface-area-increasing elements 6.

In this embodiment variant, the surface-area-increasing elements have four cutouts 16, whereby the two outermost cooling fins are in direct contact with the motor casing 3. Owing to the advantageous contour 9 of the arrangement for heat dissipation 5, in particular of the surface-area-increasing elements 6, all the cooling fins are in direct contact with the motor casing 3 in the embodiment variant shown. Neither components nor frames for spacing are arranged between the arrangement for heat dissipation 5 and the motor casing 3, so that the centrifugal pump 2 with the electric motor 1 can be designed in an extremely compact and space-optimized manner.

Figure 5:
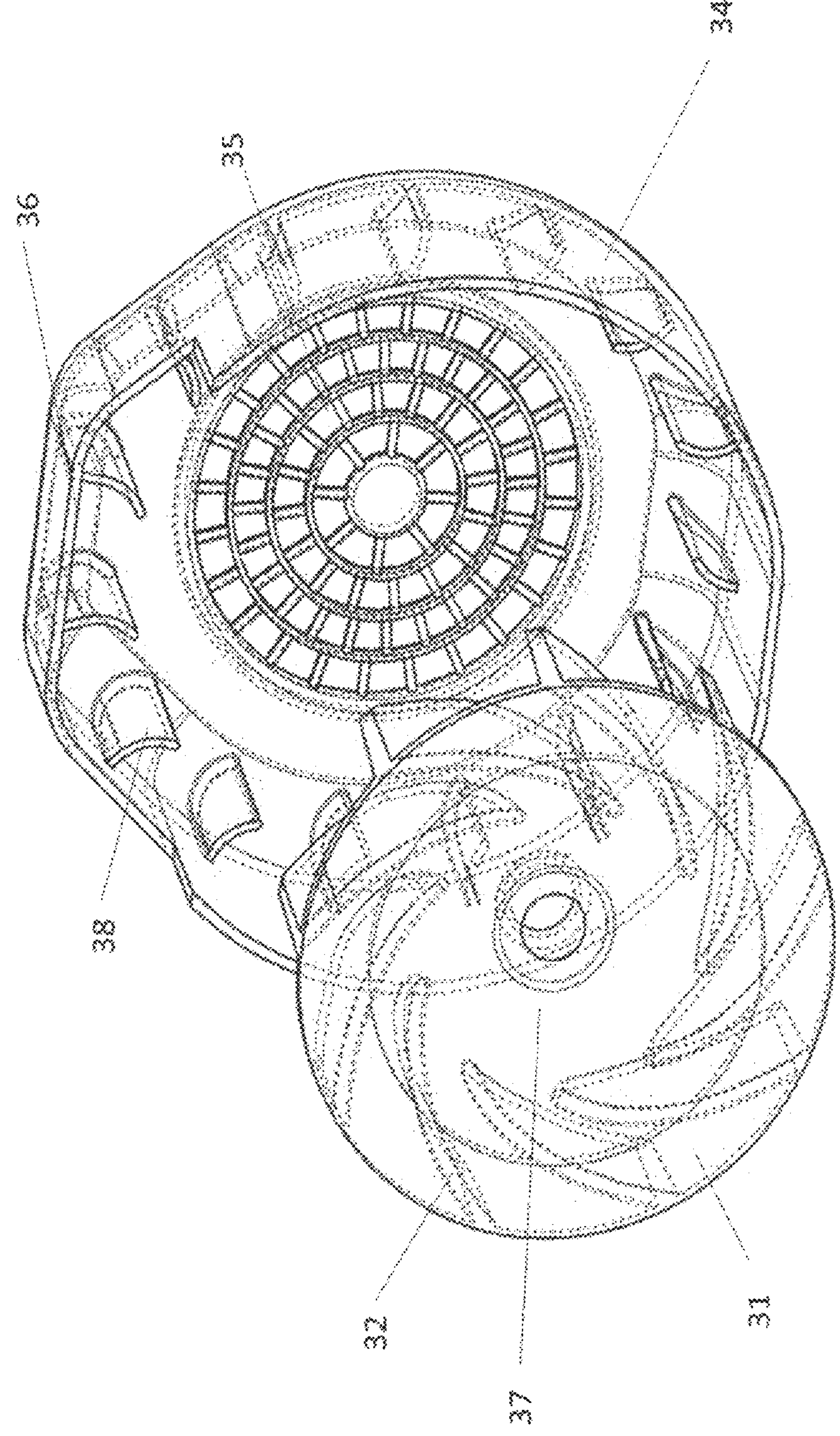
FIG. 5 is a perspective view of the fan cowl and of the fan wheel.

FIG. 5 is a perspective view of the fan cowl 34 and the fan wheel 31. The fan cowl 34 has openings in the intake grille 35, which in this exemplary embodiment are in the form of a grille inside the fan cowl 34. The fan cowl 34 additionally has an asymmetric molded-on portion 36, which directs a sufficiently large cooling air stream into the cooling channels 15. This cooling air stream is generated by the fan wheel 31, which has blades 32 which are curved backward in the rotational direction and are arranged on the funnel-shaped rear shroud 37. Guide elements 38 which are formed in one piece with the fan cowl 34 are arranged in the fan cowl 34. The guide elements 38 have a radial curvature contrary to the curvature of the fan wheel 31, and a radial inlet edge. As a result of the shaping of the blade-like guide elements 38, deflection of the cooling air stream takes place without turbulence, flow separation and without disadvantageous sound emission. The fully integrated centrifugal pump arrangement can thus be cooled in a particularly efficient, low-noise and powerful manner.

The foregoing disclosure has been set forth merely to illustrate the disclosure and is not intended to be limiting. Since modifications of the disclosed embodiments incorporating the spirit and substance of the disclosure may occur to persons skilled in the art, the disclosure should be construed to include everything within the scope of the appended claims and equivalents thereof.

The invention claimed is:

1. A centrifugal pump comprising:

an electric motor which has a motor casing and a base body, wherein the electric motor comprises motor electronics which are carried by an arrangement for heat dissipation, and the arrangement for heat dissipation has a contour, which corresponds to a contour of the motor casing, wherein the arrangement for heat dissipation has at least one recess configured for centering on a positioning element of a cooling rib of the motor casing, for centering the arrangement for heat dissipation on the motor casing, surface-area-Increasing elements of the arrangement for heat dissipation each have at least one recess corresponding to a positioning element, and heat-conducting elements of the motor casing have the same number of positioning elements as recesses formed on the surface-area-increasing elements.

2. The centrifugal pump as claimed in claim 1, wherein the surface-area-increasing elements and the arrangement for heat dissipation are formed in one piece.

3. The centrifugal pump as claimed in claim 2, wherein the base body has a raised seat in the middle and two outer installation surfaces with depressions.

4. The centrifugal pump as claimed in claim 3, wherein the motor casing is cylindrical.

5. The centrifugal pump as claimed in claim 4, wherein the motor casing has vertically and/or horizontally arranged heat-dissipating elements, and the heat-dissipating elements are omitted in an upper segment of the motor casing.

6. The centrifugal pump as claimed in claim 5, wherein the contour of the arrangement for heat dissipation is arcuate or curved.

7. The centrifugal pump as claimed in claim 6, wherein the arrangement for heat dissipation forms cooling channels with the surface-area-increasing elements and with the contour of the motor casing.

8. The centrifugal pump as claimed in claim 7, wherein the cooling channels have a trapezoidal cross section.

9. The centrifugal pump as claimed in claim 8, wherein contact surfaces of the surface-area-increasing elements have the curvature of the contour of the motor casing.

10. The centrifugal pump as claimed in claim 1, wherein the arrangement for heat dissipation has one or more guide channels for elements which produce a connection between the motor electronics and the stator winding.

11. The centrifugal pump as claimed in claim 10, wherein the motor casing has at least one duct for interlocking connection to the guide channels.

12. The centrifugal pump as claimed in claim 11, wherein the electric motor has a fan wheel, and the fan wheel is unidirectional and/or has blades which are curved backward in the rotational direction.

13. The centrifugal pump as claimed in claim 12, wherein the fan wheel is provided with a fan cowl, and the fan cowl has guide elements which are in a form of directing elements configured to guide a cooling air stream.

14. The centrifugal pump as claimed in claim 13, wherein the fan wheel is trumpet-shaped.

15. The centrifugal pump as claimed in claim 14, wherein the electric motor is connected directly to the centrifugal pump via a lantern, wherein at least one heat conduction barrier is arranged inside the lantern.

16. The centrifugal pump as claimed in claim 15, wherein the lantern has cooling fins.

17. The centrifugal pump as claimed in claim 16, wherein the centrifugal pump and the electric motor have a common, continuous shaft.

18. The centrifugal pump as claimed in claim 1, wherein the base body is arranged on the motor casing in a gap-free manner without components or frames for spacing therebetween.

19. The centrifugal pump as claimed in claim 18, wherein the base body has a raised seat in the middle formed as part of the base body and not as a separate or attached element.

20. The centrifugal pump as claimed in claim 3, wherein the base body has a raised seat in the middle formed as part of the base body and not as a separate or attached element.

* * * * *